United States Patent
Marchand et al.

(10) Patent No.: US 12,081,826 B2
(45) Date of Patent: Sep. 3, 2024

(54) METHOD FOR MANAGING THE DOWNLOAD OF IMAGES ASSOCIATED WITH IMAGE JUMPS CAPABLE OF BEING CARRIED OUT DURING ACCELERATED READING OF MULTIMEDIA CONTENT WHICH IS CONTINUOUSLY BROADCAST

(71) Applicant: ORANGE, Issy Les Moulineaux (FR)

(72) Inventors: Hervé Marchand, Chatillon (FR); Mathieu Rivoalen, Chatillon (FR)

(73) Assignee: ORANGE, Issy Les Moulineaux (FR)

( * ) Notice: Subject to any disclaimer, the term of this patent is extended or adjusted under 35 U.S.C. 154(b) by 0 days.

(21) Appl. No.: 17/438,671

(22) PCT Filed: Feb. 13, 2020

(86) PCT No.: PCT/FR2020/050259
§ 371 (c)(1),
(2) Date: Sep. 13, 2021

(87) PCT Pub. No.: WO2020/183080
PCT Pub. Date: Sep. 17, 2020

(65) Prior Publication Data
US 2022/0159333 A1  May 19, 2022

(30) Foreign Application Priority Data

Mar. 12, 2019 (FR) ................................ 1902525

(51) Int. Cl.
*H04N 21/433* (2011.01)
*H04N 21/4335* (2011.01)
*H04N 21/442* (2011.01)
*H04N 21/6587* (2011.01)

(52) U.S. Cl.
CPC ..... *H04N 21/4331* (2013.01); *H04N 21/4335* (2013.01); *H04N 21/44209* (2013.01); *H04N 21/6587* (2013.01)

(58) Field of Classification Search
CPC .......... H04N 21/4331; H04N 21/4335; H04N 21/44209; H04N 21/6587
See application file for complete search history.

(56) References Cited

U.S. PATENT DOCUMENTS

| | | | |
|---|---|---|---|
| 2008/0008456 A1* | 1/2008 | Buttars | H04N 21/4627 386/E5.067 |
| 2009/0292819 A1 | 11/2009 | Kandekar et al. | |
| 2011/0258336 A1* | 10/2011 | Salomons | H04L 65/612 709/231 |

(Continued)

OTHER PUBLICATIONS

International Search Report dated Apr. 29, 2020 for corresponding International Application No. PCT/FR2020/050259, Feb. 13, 2020.

(Continued)

*Primary Examiner* — Oschta I Montoya
(74) *Attorney, Agent, or Firm* — David D. Brush; Westman, Champlin & Koehler, P.A.

(57) ABSTRACT

A method for managing downloading of images associated with image jumps liable to be implemented during accelerated playback of content. The content is able to be downloaded from a communications network. According to the method at least one image associated with a jump is downloaded in advance.

11 Claims, 2 Drawing Sheets

(56) References Cited

U.S. PATENT DOCUMENTS

| | | | |
|---|---|---|---|
| 2013/0103660 A1* | 4/2013 | Welsh | G06F 16/14 |
| | | | 707/705 |
| 2014/0282262 A1 | 9/2014 | Gregotski et al. | |
| 2015/0326901 A1* | 11/2015 | Tiraspolsky | H04N 21/262 |
| | | | 725/31 |
| 2017/0245013 A1* | 8/2017 | Wolff | H04N 21/4334 |
| 2018/0152743 A1 | 5/2018 | Wood | |
| 2020/0145701 A1* | 5/2020 | Liu | H04N 21/2402 |

OTHER PUBLICATIONS

Written Opinion of the International Searching Authority dated Apr. 29, 2020 for corresponding International Application No. PCT/FR2020/050259, filed Feb. 13, 2020.

Sung-Ju Lee et al., "An Interactive Video Delivery and Caching System Using Video Summarization", Mar. 1, 2002 (Mar. 1, 2002).

English translation of the Written Opinion of the International Searching Authority dated Jun. 15, 2020 for corresponding International Application No. PCT/FR2020/050259, filed Feb. 13, 2020.

* cited by examiner

[Fig. 1]
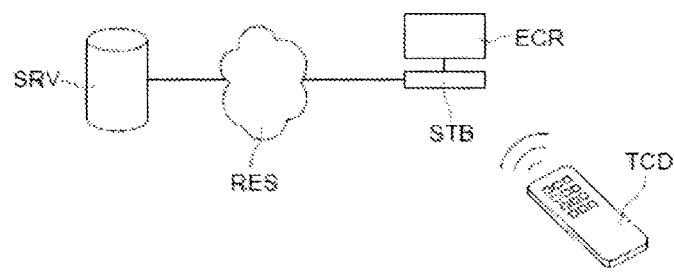
[Fig. 2]
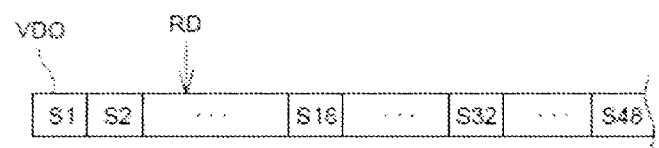
[Fig. 3]
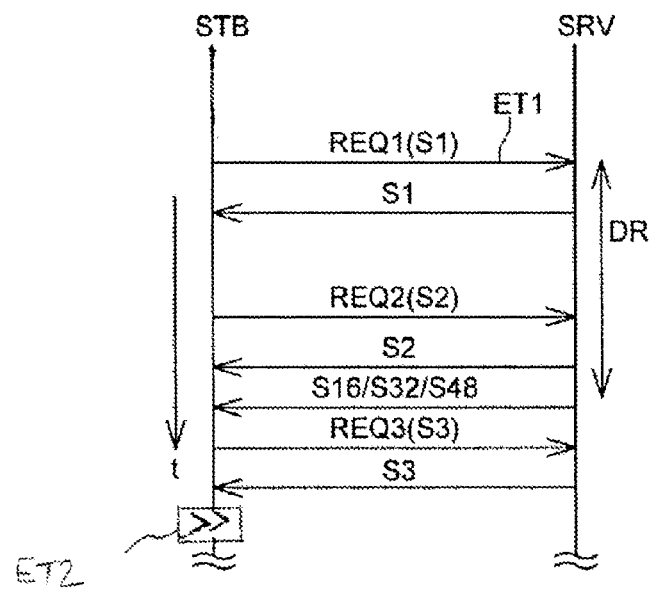

[Fig. 4]
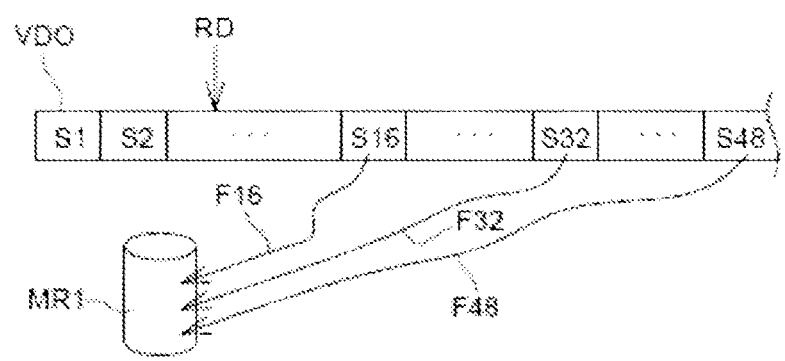
[Fig. 5]
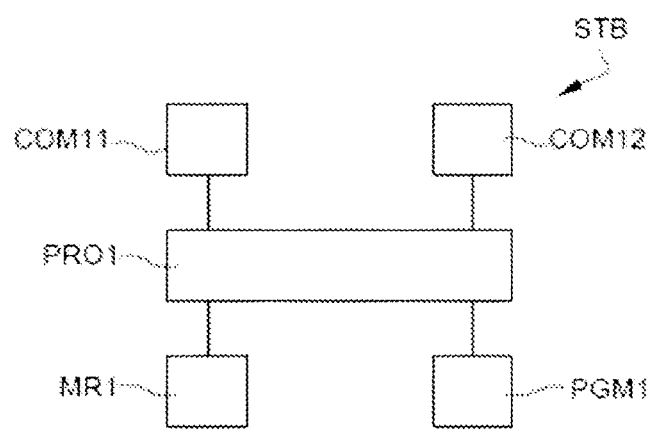

METHOD FOR MANAGING THE DOWNLOAD OF IMAGES ASSOCIATED WITH IMAGE JUMPS CAPABLE OF BEING CARRIED OUT DURING ACCELERATED READING OF MULTIMEDIA CONTENT WHICH IS CONTINUOUSLY BROADCAST

CROSS-REFERENCE TO RELATED APPLICATIONS

This Application is a Section 371 National Stage Application of International Application No. PCT/FR2020/050259, filed Feb. 13, 2020, which is incorporated by reference in its entirety and published as WO 2020/183080 A1 on Sep. 17, 2020, not in English.

TECHNICAL FIELD

The field of the invention is that of digital multimedia content, specifically digital audio and/or video content, also called audiovisual content. The invention relates more particularly to a method for managing the display of images associated with image jumps liable to be implemented during accelerated playback of multimedia content.

In the present text, accelerated playback targets both rewinding and fast-forwarding for implementing image jumps in multimedia content.

An item of content is for example television-on-demand content, video-on-demand content, etc.

Prior Art

There are nowadays many audiovisual content rendering terminals allowing a user to access multimedia content such as video on demand. These rendering terminals are designed to receive this digital content in the form of multimedia data and to render it to the user. This rendering consists in delivering, via the terminal, the digital content in a form that is accessible to the user. For example, received data corresponding to a video are generally decoded and then rendered via the terminal in the form of a display of the corresponding video with its associated soundtrack. The display may take place on a screen of the rendering terminal itself or on a remote screen associated therewith. Such multimedia content rendering terminals are more often than not able to be controlled remotely by the user by way of remote control devices, and in particular remote controls. A remote control offers multiple commands able to be executed by the rendering terminal. The purpose of commands is for example to fast-forward (>>) or to rewind (<<). These commands make it possible to act on the rendering of the digital content and in particular to accelerate the rendering of the content on the screen. When accelerating playback, some images (also called thumbnails) of the content are displayed on the screen. The thumbnail thus displayed allows a user in particular to find his bearings in the content when accelerating playback.

It should be noted that the user may activate the fast-forward/rewind function in a manner other than by way of a remote control. The fast-forward/rewind function may also be activated via an application dedicated to the management of the multimedia stream player when the latter is associated with a client terminal, such as for example a tablet or a smartphone. The functions may also be present on the rendering device through buttons that are present on the rendering device.

The accelerations that are traditionally used nowadays multiply the playback speed by two (×2), by four (×4), by sixteen (×16), by thirty-two (×32) or even sixty-four (×64). Thus, when a user is for example watching a video, he has the option of moving quickly to a precise point thereof by accelerating rendering thereof by activating the fast-forward/rewind function.

These accelerations result in a number of image jumps in the content that depends on the chosen acceleration speed. The chosen speed determines new playback times following the acceleration, and respective images extracted from the content to be rendered on the screen.

One problem is that the time to download the image, the image associated with the new playback time resulting from a jump, may be lengthy. This download time is all the lengthier when the image is contained in an image segment and the downloading of the image requires the downloading of the associated segment. Such a segment is used for example when multimedia content is received in adaptive streaming mode. Indeed, the MPEG-DASH (for "Dynamic Adaptive Streaming over HTTP") standard is an audiovisual broadcasting format standard for broadcasting over the Internet; this standard is based on preparing the content in various presentations of variable quality and bit rate, divided into segments of a short duration (of the order of a few seconds), also called "chunks" by those skilled in the art. Each of these segments is made available individually by way of an exchange protocol between the rendering terminal and the multimedia content provider server. The protocol that is mainly targeted is the HTTP protocol, but other protocols (for example FTP) may also be used. The organization of the segments and the associated parameters are published in a manifest in XML format.

Ultimately, the display of an image representative of a jump includes at least the following durations:
 a duration to load the segment,
 a duration linked to the extraction of an image from the segment,
 and a duration to render this segment.

The addition of these durations may unfortunately be greater than the period between two jumps, in particular when the bit rate on the network that is used is low; this is often the case with an ADSL network. It follows that the chosen acceleration, for example the (×64) acceleration, is intentionally reduced so as to render each image correctly. In addition, this reduction in the acceleration speed takes place without the user's knowledge. This solution is unacceptable in terms of quality of service.

The invention offers a solution that does not have the drawbacks of the prior art.

The Invention

To this end, according to one functional aspect, one subject of the invention is a method for managing the display of images associated with image jumps liable to be implemented during accelerated playback of multimedia content on a rendering device, the content being able to be downloaded from a communication network, characterized in that at least one image associated with a jump is downloaded in advance.

According to the invention, an image associated with a jump (also called thumbnail in the present application) is downloaded before the execution of a command to play back this image. During accelerated playback, the method comprises displaying successive images, loaded in advance, representative of the state of progress of the accelerated playback in the content.

It will be seen hereinafter that, if multiple images are downloaded in advance, these images may be downloaded in a single message or downloaded in succession. The choice may depend on the number of images to be downloaded.

The advance downloading of an image associated with a jump makes it possible to provision images before and/or during the phase of playing back the content and may therefore be used subsequently during accelerated playback of the content without requiring downloading. The duration linked to the playback of a thumbnail is then reduced to the duration of playing back the image stored in the memory of the rendering device, this image having been downloaded in advance and therefore stored in memory, ready to be played back.

The proposed solution aims to anticipate the loading of images that will be displayed when accelerating playback of the multimedia content. It will be seen hereinafter that the image may be contained in an image segment. The advance loading makes it possible to anticipate the loading of the segment and the extraction of the image from the segment; The display duration is then reduced to the duration linked to the rendering of the image stored in a memory of the rendering terminal. In this way, even if the bit rate on the communication network is low, the invention ensures that the acceleration applied to the playback of the content will actually be the selected acceleration.

According to a first embodiment, the playback step is preceded by a step of receiving the content from a communication network; in this configuration, the advance download is performed when the bit rate on the network is less than a given bit rate. This first embodiment avoids implementing the method of the invention when this is not necessary.

According to a second embodiment, which may be implemented as an alternative or in addition to the previous one, an image stored in advance is stored in a memory, and in that it is erased from the memory when the playback of the content is stopped. This second embodiment has the advantage of optimizing the memory space in the rendering terminal. The stop in question indifferently targets a final stop, a pause, or any other function for stopping or ending playback of multimedia content.

According to a third embodiment, which may be implemented as an alternative or in addition to the previous ones, an image stored in advance is stored in a memory; and is erased from the memory after a given number of playbacks of this image. Just like the first embodiment, this second embodiment has the advantage of optimizing the memory space in the rendering terminal by erasing the thumbnail when it has been played back a number N (N is an integer) of times, for example just once. This third embodiment also avoids new downloading of images in advance when the content is intended to be played back multiple times. In this configuration, N is strictly greater than 1. For example, if N is set to 2, the image downloaded in advance may be played back twice from memory.

According to a fourth embodiment, which may be implemented as an alternative or in addition to the previous ones, the images stored in advance are stored in a memory; and are then retained in the memory for a given duration. This third embodiment has the advantage, in particular if the content is intended to be replayed, of subsequently having images that are loaded in advance, and therefore avoids having to reload the images in advance when this same content is accessed subsequently.

According to a fifth embodiment, which may be implemented as an alternative or in addition to the previous ones, if the image to be displayed is contained in an image segment, the image chosen from the segment is an intra image.

According to a sixth embodiment, which may be implemented as an alternative or in addition to the previous ones, the advance loading step is performed after a waiting period. This sixth embodiment takes into consideration a user's right to repent, who may decide not to view the content, for example after a few seconds of rendering. This embodiment avoids downloading segments in advance when the user decides to stop the rendering of the content a short time after the start of rendering.

According to a seventh embodiment, which may be implemented as an alternative or in addition to the previous ones, when playback is scheduled for a given date, the advance loading step is performed before the given date. This embodiment avoids downloading images in advance during playback of the content. This embodiment optimizes the use of bandwidth. More generally, the advance downloading of the thumbnails as a background task will preferably be such that it does not alter the quality of the current playback of the content. The thumbnails (in reality the segments that contain the images) will be downloaded at a controlled rate that does not interfere with the recovery of the segments of the stream currently being played back.

According to one hardware aspect, the invention relates to a management entity for managing the display of images associated with image jumps liable to be implemented during accelerated playback of the content, the content being able to be downloaded from a communication network, characterized in that it comprises a download module able to download at least one image associated with a jump in advance. According to another hardware aspect, the invention relates to a decoder comprising a management entity as defined above.

According to another hardware aspect, the invention relates to a computer program able to be implemented on an entity as defined above, the program comprising code instructions that, when it is executed by a processor, performs the steps of the selection method that are defined above.

Finally, according to another hardware aspect, the invention relates to a data medium on which at least one sequence of program code instructions for executing a management method as defined above has been stored.

Such a recording medium may be any entity or device capable of storing the program. For example, the medium may contain a storage means, such as a ROM, for example a CD-ROM or a microelectronic circuit ROM, or else a magnetic recording means, for example a USB key or a hard drive.

On the other hand, such a recording medium may be a transmissible medium such as an electrical or optical signal, which may be routed via an electrical or optical cable, by radio or by other means, such that the computer program that it contains is able to be executed remotely. The program according to the invention may in particular be downloaded from a network, for example the Internet.

As an alternative, the recording medium may be an integrated circuit in which the program is incorporated, the circuit being designed to execute or to be used in the execution of the abovementioned display control method.

The invention will be better understood on reading the following description, which is given by way of example and with reference to the appended drawings, in which:

BRIEF DESCRIPTION OF THE DRAWINGS

FIG. 1 shows a computer system on which one exemplary embodiment of the invention is illustrated.

FIG. 2 illustrates division of multimedia content into segments according to one embodiment of the invention.

FIG. 3 illustrates an exchange of messages between a rendering device and a multimedia content provider server.

FIG. 4 illustrates a variant of the embodiment of the invention described with reference to FIG. 2.

FIG. 5 is a simplified block diagram of the hardware structure of the controlled rendering device.

DETAILED DESCRIPTION OF EMBODIMENTS OF THE INVENTION

A presentation is now given, with reference to FIG. 1, of a general overview of all the equipments implemented according to one embodiment of the invention. In this example, it is assumed that a television set, equipped with a multimedia content display screen ECR, is connected to a content rendering terminal STB, for example an HDMI key referenced STB. Such a key STB allows the user for example to access digital content in adaptive streaming mode for real-time (or live) television content, but also to access video-on-demand content, or to render personal content stored in a home network, such as a video of the last vacation or the last family event, on the screen ECR of the television set. This is the case for example for the Chromecast® apparatus developed by Google® or for CléTV® by Orange®.

Such keys STB are conventionally plugged into the HDMI port of a television set ECR and communicate, via a Wi-Fi® connection, with another apparatus of the home communication network (residential gateway, computer, smartphone, tablet, etc.) that is connected to a wide-area communication network such as the Internet, with a view to rendering the multimedia content received by a compatible software application on the television set ECR.

It will be noted that the technique of the invention is of course not limited to such an HDMI key, which is described here by way of simple illustrative example, but that it may be applied to any audiovisual rendering equipments able to be controlled from a connected remote control, such as a decoder (also called set-top box by those skilled in the art) or a connected television set, for example. These apparatuses will hereafter be referred to by the generic designation of STB decoders.

It is assumed that the STB decoder is able to enter into communication with a content server (not shown in the figure) in order to receive one or more items of content, for example a video on demand that the user wishes to view, for which it then controls rendering on the screen of the television set ECR.

The STB decoder is also configured so as to be able to communicate with a remote control device TCD, illustrated by way of a remote control, for example in accordance with the Bluetooth® communication protocol. The exemplary embodiment is based on wireless communication between the remote control and the STB decoder; however, the invention may also be implemented with wired communication.

The remote control TCD comprises control buttons. The buttons are, indifferently, physical buttons or virtual buttons displayed on a human/machine interface and present on the remote control TCD.

The remote control is equipped with communication means so as to transmit, to the STB decoder, commands to be executed there. In order to illustrate the invention, we will focus on the control buttons for accelerating playback of the content, specifically the fast-forward button (>>) and the rewind button (<<). The invention is obviously not limited to the two abovementioned commands but, on the contrary, extends to other similar commands.

These buttons offer the option of accelerating playback of multimedia content. Multiple playback speeds make it possible to reach a multimedia content scene more or less quickly.

The storage location of the multimedia content is arbitrary. In our example, the content is a video-on-demand video stored on a server SRV.

In our example, this video is downloaded in streaming mode in accordance with the MPEG Dash standard. According to this standard, the multimedia content comprises multiple time segments that are downloaded. It will be recalled that a segment conventionally comprises multiple types of image, specifically Intra images (I), and one or more images that may be predicted based on this Intra image through motion estimation/compensation, specifically Predictive images (P) and Bidirectional images (B).

In our example, when playback of the content is accelerated, an image from a segment is displayed on the screen. The chosen image is generally an intra image from the segment, this image being of better quality than the other two because it is fully coded, unlike the other two abovementioned types of image. Of course, the invention is not limited to this choice; another type of image may be chosen instead of an Intra image.

As seen above, the loading of a segment linked to a jump may take a certain amount of time, which may alter the implementation of the jumps depending on the chosen speed, in particular when this speed is high, for example the speed (×64), which makes it possible to accelerate the playback speed to 64 times faster than normal playback.

According to the invention, the images associated with the image jumps are downloaded in advance. In our exemplary embodiment, since the image forms part of a segment, multiple segments linked to image jumps are loaded in advance. The thumbnails extracted from the segments, preferably the Intra images, will be displayed on the screen when playback is accelerated.

More precisely, according to one embodiment, the method comprises the following steps:
  Transmitting a command to access the content,
  Receiving and storing images of the content in advance;
  Receiving a fast-forward command,
  Executing accelerated playback starting from the current time,
  During the accelerated playback, displaying successive images, loaded in advance, representative of the state of progress of the fast-forwarding in the content.

The invention makes it possible, during an accelerated playback phase, to show the state of progress of the playback by rendering successive images that have been loaded in advance. A user viewing the screen during the accelerated playback and wishing to access a particular time of the content, for example a given scene of the content, may interrupt the accelerated playback and access the desired scene.

Consideration will be given, with reference to FIG. 2, to a video VDO having segments S1-Sn (n is an integer). An arrow referenced RD indicates the current playback time of the video VDO.

In our example, segments S16-S32-S48 are associated with jumps implemented when accelerating playback. If the chosen acceleration is ×16, the segments S16×n (n is an integer) will be displayed successively during the accelerated playback at each jump of 16 segments.

FIG. 3 illustrates a first embodiment of the invention.

A distinction will be drawn hereinafter between two types of segment:

the segments, called segments to be played back in this text, which correspond to the segments of the video stream in normal playback mode, and the segments, called advance segments, received in advance and that are intended to be used when the playback of the content is accelerated.

With reference to FIG. 3, the chosen embodiment comprises the following steps:

In a first step ET1, the STB decoder requests playback of video content VDO. For this purpose, the STB decoder transmits multiple access requests REQn(Sn) (n=1 to 3 in FIG. 3) to access respective segments Sn and, in return, receives the requested segments S1-S3.

The segments S1-S3 successively received at this stage correspond to the segments to be played back. In FIG. 3, a first segment S1 is received, and a second segment S2 is then received.

In our example, following the reception of segments S1 and S2 to be played back, the STB decoder receives segments S16/S32/S48 in advance, which will be used during any accelerated playback of the video VDO. In this configuration, when playback is accelerated, when the jump that is implemented corresponds to segment S16, the image associated with this segment S16 is found in the memory of the STB decoder and displayed on the screen ECR; These steps are executed for the jumps that are implemented. The start time for the advance download of the segments may vary. The start time for the advance loading may take place before the video is played back, or may take place during playback.

Starting before playback of the video may be implemented when the video is scheduled to be played back on a particular date. Indeed, the user may plan to view a video on a given date with friends. In this case, the segments are loaded in advance before rendering.

If the start takes place during playback, this may take place as soon as the content is played back, or later on after a waiting period DR.

Starting the download in advance, as soon as the content is played back, does not take into consideration possible withdrawal by the user. In this case, some segments may be needlessly downloaded in advance if the user stops playback prematurely. A waiting period DR may be useful in this case. Indeed, such a carefully chosen waiting period DR, for example 2 minutes, has the advantage of confirming a high probability that the user will continue playing back the video VDO. The storage of the segments in advance is therefore not performed needlessly. The start time for the waiting period is arbitrary; this time may correspond to the reception of the request REQ1(S1) in step ET1 as illustrated in FIG. 3. This time could also have corresponded to the time of pressing the fast-forward button on the remote control.

The advance loading of images may also end at various times. For example, the advance loading is not performed on the end credits of a film, because it is rare for content to be rendered right to the end; indeed, the user often stops rendering at the beginning of the end credits.

In our example, it will be considered that the start begins after a waiting period DR. In FIG. 3, segments S16/S32/S48 are downloaded in advance upon expiry of this period DR, just after the reception of the second segment S2.

In our example, only images associated with ×16 fast-forwarding are downloaded in advance, with a pitch of sixteen segments. Thus, if ×2 fast-forwarding is requested, the segments in relation to the jumps are downloaded, for example the segments S2/S4/S6/etc., with the exception of the segments downloaded in advance, for example S16/S32/etc. which are played back directly from the memory of the rendering device.

It will be noted that the invention is obviously not limited to this example, and the images corresponding to the speeds ×2 and ×4 could also have been downloaded in advance.

In our example, with reference to FIG. 4, which will be described below, the segments downloaded in advance with the speed ×16 are the three segments S16, S32, S48. These three segments may be downloaded at the same time, as explained above with reference to FIG. 3, or successively at various times. The number of segments downloaded in advance may obviously be less than or greater than three.

In our example, once the three segments S16, S32, S48 downloaded in advance have been received, the intra images contained in the segments are preferably extracted from the received segments and are stored in a buffer memory of the STB decoder in association with times of the video. At this stage, the images downloaded in advance are ready to be played back in the event of accelerated playback of the video.

In a second step ET2, following the storage of the three segments S16, S32, S48 in advance, it is assumed that a user of the remote control TCD wishes to accelerate playback of the video VDO. For this purpose, this user presses the fast-forward button >> on the remote control and selects for example the speed (×16). The acceleration command is transmitted to the STB decoder, which receives it. The STB decoder then executes the received command and implements segment jumps in the video, for example with a pitch of sixteen segments. At each jump that is implemented, the decoder searches its buffer memory for the image loaded in advance that corresponds to the implemented jump and displays it on the screen ECR.

Multiple actions are subsequently possible. The user may interrupt the accelerated playback because he is ready to watch the rest of the video at normal speed. The user restarts normal video playback mode, for example via a button on the remote control or via the dedicated application. The multimedia stream player then resumes processing the video stream starting from the time desired by the user, and the images of the video that are displayed on the client terminal are those corresponding to the images of the video starting from the time when video playback is restarted.

The embodiment described above may be subject to variants described below. The advance loading of thumbnails is a processing operation that is performed as a background task, preferably without impacting the quality of the video played back in normal mode. If the available bandwidth is not sufficient, a management module MOD present in the decoder reduces the number of segments to be downloaded in advance.

FIG. 4 schematically shows segments of a video VDO. In the example chosen, all segments that are a multiple of 16 are downloaded in advance. In this FIG. 4, a pointer RD represents the current playback time. Arrows F16/F32/F48/etc. illustrate downloads of the segments S16/S32/S48/etc. that take place in advance to a memory MR1 of the STB decoder. In our example, this download takes place at the playback time RD.

According to one variant, out of a number NB of segments able to be downloaded in advance, only a subset are downloaded, for example the first ones.

According to another variant, the number of segments downloaded in advance is determined on the basis of the size of the buffer memory.

With reference to FIG. 5, consideration will now be given to the simplified structure of the STB decoder according to one exemplary embodiment of the invention. Such an STB decoder is designed to implement the method for managing the display of images during accelerated playback of multimedia content.

The STB decoder comprises physical and/or software resources, specifically memories M associated with a processor CPU. The memories may be ROMs (Read-Only Memory) or RAMs (Random Access Memory) or even flash memories. They make it possible in particular to store a content selection manager according to one embodiment of the invention.

The decoder furthermore comprises a processing circuit CT1 for implementing the management method according to various embodiments of the invention, the processing circuit CT1 containing a processor PROC1 driven by a computer program PG1 representative of the management method, stored in the read-only memory. On initialization, the code instructions of the computer program PG1 are for example loaded into a RAM memory, denoted MR1, before being executed by the processing circuit CT1.

The decoder primarily comprises:
a communication interface COM11 that is designed to receive commands from the remote control TCD;
a communication interface COM22 that is designed to exchange data with a remote server so as to receive multimedia content segments as described above.

The communication interfaces COM10, COM11 and the management entity MNG are driven by the processor PROC1 of the processing circuit CT1.

FIG. 5 illustrates just one particular way, out of several possible ones, for implementing the STB decoder such that it performs the steps of the method described above with reference to FIGS. 2 to 4 (in any one of the various embodiments, or in a combination of these embodiments). Specifically, these steps may be performed indiscriminately on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

It should be clarified lastly here that the term module or the term entity may correspond equally to a software component or to a hardware component or to a set of software and hardware components, a software component itself corresponding to one or more computer programs or sub-routines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The invention claimed is:

1. A management method implemented by a management entity and comprising:
managing display of images associated with image jumps liable to be implemented during accelerated playback of multimedia content on a rendering device, wherein the managing comprises, on the rendering device:
receiving the content from a communication network in a streaming mode each time a request to read this content is received;
downloading by anticipation, after playing the content has started from the communication network, a subset of images associated with at least one jump in advance of receiving an accelerated playback command for playing back the content on the rendering device, said downloading taking place after a waiting period of a predetermined duration, said waiting period starting while playing the content;
storing the subset of images in a memory;
playing back the streamed content; and
after receiving the accelerated playback command, automatically rendering successively on the rendering device the subset of images that were downloaded in advance.

2. The management method as claimed in claim 1, which further comprises:
playing back the content on the rendering device; and
prior to playing back the content, receiving the content from the communication network, and wherein the advance downloading is performed when the bit rate on the communication network is less than a given bit rate.

3. The management method as claimed in claim 1, wherein the subset of images is erased from the memory when the playback of the content is stopped.

4. The management method as claimed in claim 1, wherein the subset of images is erased from the memory after a given number of playbacks of the subset of images.

5. The management method as claimed in claim 1, wherein playback of the content is scheduled for a given date, the advance downloading is performed before the given date.

6. The management method according to claim 1, wherein:
the content comprises a plurality of successive segments; and
the images of the subset of images correspond to different non-successive segments of the content.

7. A management entity comprising:
a processor; and
a non-transitory computer-readable medium comprising program code instructions stored thereon which when executed by the processor configure the management entity to perform a method of managing display of images associated with image jumps liable to be implemented during accelerated playback of the content on a rendering device, wherein the managing comprises, on the rendering device:
receiving the content from a communication network in a streaming mode each time a request to read this content is received;
downloading by anticipation after playing the content has started from the communication network a subset of images associated with at least one jump in advance of receiving an accelerated playback command for playing back the content on the rendering device, said downloading taking place after a waiting period of a predetermined duration, said waiting period starting while playing the content;
storing the subset of images in a memory;
playing back the streamed content; and
after receiving the accelerated playback command, automatically rendering successively on the rendering device the subset of images that were downloaded in advance.

8. A decoder comprising a management entity as defined in claim 7.

9. The management entity according to claim 7, wherein:
the content comprises a plurality of successive segments; and
the images of the subset of images correspond to different non-successive segments of the content.

10. A non-transitory computer-readable data medium on which at least one sequence of program code instructions is stored for executing a management method when the instructions are executed by a processor of a management entity, wherein the instructions configure the management entity to:
manage display of images associated with image jumps liable to be implemented during accelerated playback of multimedia content on a rendering device, the managing comprising, on the rendering device:
receiving the content from a communication network in a streaming mode, each time a request to read this content is received;
downloading by anticipation after playing the content has started from the communication network a subset of images associated with at least one jump in advance of receiving an accelerated playback command for playing back the content on the rendering device, said downloading taking place after a waiting period of a predetermined duration, said waiting period starting while playing the content;
storing the subset of images in a memory;
playing back the streamed content; and
after receiving the accelerated playback command, automatically rendering successively on the rendering device the subset of images that were downloaded in advance.

11. The non-transitory computer-readable data medium according to claim 10, wherein:
the content comprises a plurality of successive segments; and
the images of the subset of images correspond to different non-successive segments of the content.

* * * * *